US011500401B1

United States Patent
Marsh, Jr.

(10) Patent No.: US 11,500,401 B1
(45) Date of Patent: Nov. 15, 2022

(54) PASSIVE DUAL MODULATING REGULATOR FOR HYDROGEN GENERATION

(71) Applicant: LG, LLC, Wetumpka, AL (US)

(72) Inventor: Gordon J Marsh, Jr., Wetumpka, AL (US)

(73) Assignee: LG, LLC, Wetumpka, AL (US)

( * ) Notice: Subject to any disclaimer, the term of this patent is extended or adjusted under 35 U.S.C. 154(b) by 0 days.

(21) Appl. No.: 17/749,595

(22) Filed: May 20, 2022

(51) Int. Cl.
| | |
|---|---|
| G05D 16/00 | (2006.01) |
| G05D 16/06 | (2006.01) |
| C25B 9/19 | (2021.01) |
| C25B 1/04 | (2021.01) |
| C25B 15/08 | (2006.01) |
| C25B 9/60 | (2021.01) |

(52) U.S. Cl.
CPC ............. *G05D 16/028* (2019.01); *C25B 1/04* (2013.01); *C25B 9/19* (2021.01); *C25B 9/60* (2021.01); *C25B 15/08* (2013.01); *G05D 16/065* (2013.01)

(58) Field of Classification Search
CPC .................................................. G05D 16/028
See application file for complete search history.

(56) References Cited

U.S. PATENT DOCUMENTS

| | | | | |
|---|---|---|---|---|
| 3,216,441 | A * | 11/1965 | Thorsheim | ......... G05D 16/0619 137/595 |
| 4,902,397 | A * | 2/1990 | Kelham | .................. C25B 15/02 204/266 |
| 5,507,309 | A * | 4/1996 | Dean | .................. G05D 16/0658 137/87.03 |
| 7,048,839 | B2 * | 5/2006 | Harada | ..................... C25B 9/05 204/266 |
| 2004/0013918 | A1 | 1/2004 | Merida-Donis | |
| 2004/0072040 | A1 | 4/2004 | Duffy et al. | |
| 2006/0174952 | A1 | 8/2006 | Curello et al. | |
| 2019/0056107 | A1 | 2/2019 | Desai et al. | |

\* cited by examiner

*Primary Examiner* — Brian W Cohen
(74) *Attorney, Agent, or Firm* — Warner Norcross + Judd LLP

(57) ABSTRACT

A passive dual modulating regulator that responds to a pressure differential between a hydrogen-side and an oxygen-side of one or more proton-exchange membrane (PEM) cells is provided. The passive dual modulating regulator includes a flexible diaphragm that is clamped along its periphery between hemispherical chambers. A bi-directional valve assembly extends through the flexible diaphragm and includes opposing valve plugs for selectively closing the output ports of the respective hemispherical chambers. Large or sustained pressure imbalances between the hydrogen-side and the oxygen-side of a hydrogen generation system are avoided without active control inputs of any kind, and consequently a rupture of the PEM is entirely avoided.

20 Claims, 7 Drawing Sheets

PASSIVE DUAL MODULATING REGULATOR FOR HYDROGEN GENERATION

FIELD OF THE INVENTION

The present invention relates to water electrolysis for the generation of hydrogen fuel using proton-exchange membrane stacks.

BACKGROUND OF THE INVENTION

Water electrolysis is the process by which water is separated into hydrogen and oxygen through the application of electrical energy. Among existing electrolysis technologies, proton-exchange membrane (PEM) electrolyzers use a proton-exchange membrane as an ionic conductor. The proton-exchange membrane consists of a thin, solid ion-conducting membrane instead of an aqueous solution as found in alkaline electrolyzers. The membrane transfers the $H_+$ ion (i.e., proton) from an anode to a cathode and separates hydrogen and oxygen gases.

PEM electrolysis is generally preferred over alkaline electrolysis because no caustic electrolyte is used in PEM electrolysis. In addition, PEM electrolysis has faster ion transportation due to the thin membrane (e.g., Nafion from DuPont), which is important under fluctuating conditions. In addition, alkaline cells suffer from cross-contamination, as both gases (hydrogen and oxygen) and alkaline would be present in the output gas, requiring scrubbers to remove the oxygen and alkaline contamination from the hydrogen gases. This is particularly important because just 3% of oxygen in hydrogen is enough to form an explosive mixture.

PEM electrolyzers include differential pressure designs and balanced pressure designs. In either differential or balanced pressure designs, pressure regulation of hydrogen and oxygen gases is extremely important to the efficiency and life of the PEM electrolyzer. Accordingly, there remains a continued need for an improved pressure regulator for PEM electrolyzers. In particular, there remains a continued need for an improved pressure regulator for balancing oxygen and hydrogen gases with no cross-contamination.

SUMMARY OF THE INVENTION

A passive dual modulating regulator that responds to a pressure differential between a hydrogen-side and an oxygen-side of one or more PEM cells is provided. The passive dual modulating regulator includes a flexible diaphragm that is clamped along its periphery between hemispherical chambers. A bi-directional valve assembly extends through the flexible diaphragm and includes opposing valve plugs for restricting and ultimately closing the output ports of the respective hemispherical chambers. Sustained pressure imbalances between the hydrogen-side and the oxygen-side of a hydrogen generation system are avoided without active control inputs of any kind, and consequently a rupture of an electrolyzer membrane is entirely avoided.

In one embodiment, opposing ends of the bi-directional valve assembly include an alignment rod, a valve plug, a valve stem, and a fender washer. The alignment rod is externally threaded at one end for attachment to the valve stem and secures the valve plug against the valve stem. The valve plug comprises a beveled washer that is formed from silicon rubber and includes a beveled engagement surface for engaging a matching valve seat that has been machined into the concave inner surface of each hemispherical chamber. The valve stem is internally threaded at a distal end for attachment to the alignment rod and internally threaded at a proximal end for attachment to a headless screw, which joins each side of the valve assembly together.

Because the flexible diaphragm is sensitive to even small pressure differentials, the high-pressure side pushes the diaphragm towards the low-pressure side to close off the output port of the low pressure side. The pressure on the low-pressure side will slowly build due to the output port being closed while gas is continuously generated at the PEM cells. As the pressure equalizes, the output port gradually opens. Consequently, the thin polymer membrane within each PEM cell is balanced on each side, preventing a rupture of the thin polymer electrolyte membrane.

In another embodiment, a hydrogen generating system is provided. The hydrogen generating system includes one or more PEM cells, an oxygen-water separator, a hydrogen-water separator, a hydrogen storage tank, and a passive dual modulating regulator. The hydrogen-water separator receives hydrogen gas and trace amounts of water from the cathode-side of the PEM cells, and the hydrogen gas is drawn off into a hydrogen output line. The oxygen-water separator acts as the primary water reservoir for the PEM cells and collects excess water carried up with oxygen from the anode-side of the PEM cells. Oxygen gas is then drawn off from the oxygen-water separator into an oxygen output line. The passive dual modulating regulator is disposed between the hydrogen output line and the oxygen output line for maintaining a balanced pressure between the hydrogen-side and the oxygen-side of the PEM cell or cells. The hydrogen output line is coupled to a pressurized hydrogen storage tank, and the oxygen output line is coupled to an oxygen valve and gauge for safely discharging oxygen gas into the atmosphere.

In some embodiments, the hydrogen fuel is routed to a gas grill having one or more hydrogen burners. The gas grill can be suitable for personal or commercial applications, for example restaurants or cafeterias. Gas grills operating on hydrogen gas are environmentally friendly in that hydrogen grills generate no carbon emissions and operate directly from renewable energy, such as solar energy collected by photovoltaic cells. The hydrogen generation system and passive dual modulating regulator are not limited to cooking applications and can be used in other systems as desired, including emergency backup power, transportation, and propulsion systems.

These and other features and advantages of the present invention will become apparent from the following description of an embodiment of the invention, when viewed in accordance with the accompanying drawings and appended claims.

DETAILED DESCRIPTION OF THE CURRENT EMBODIMENTS

The current embodiments include a passive dual modulating regulator that responds to a pressure differential between a hydrogen-side and an oxygen-side of one or more PEM cells to ensure the PEM cell does not rupture. Large or sustained pressure imbalances between the hydrogen-side and the oxygen-side are avoided without active control inputs of any kind. Before the passive dual modulating regulator is discussed in detail however, an exemplary hydrogen storage system having two PEM cells will now be described. While this system is described below as generating hydrogen fuel for cooking applications, the passive dual modulating regulator is not limited to any one such system, and can be used in other systems as desired.

Figure 1:
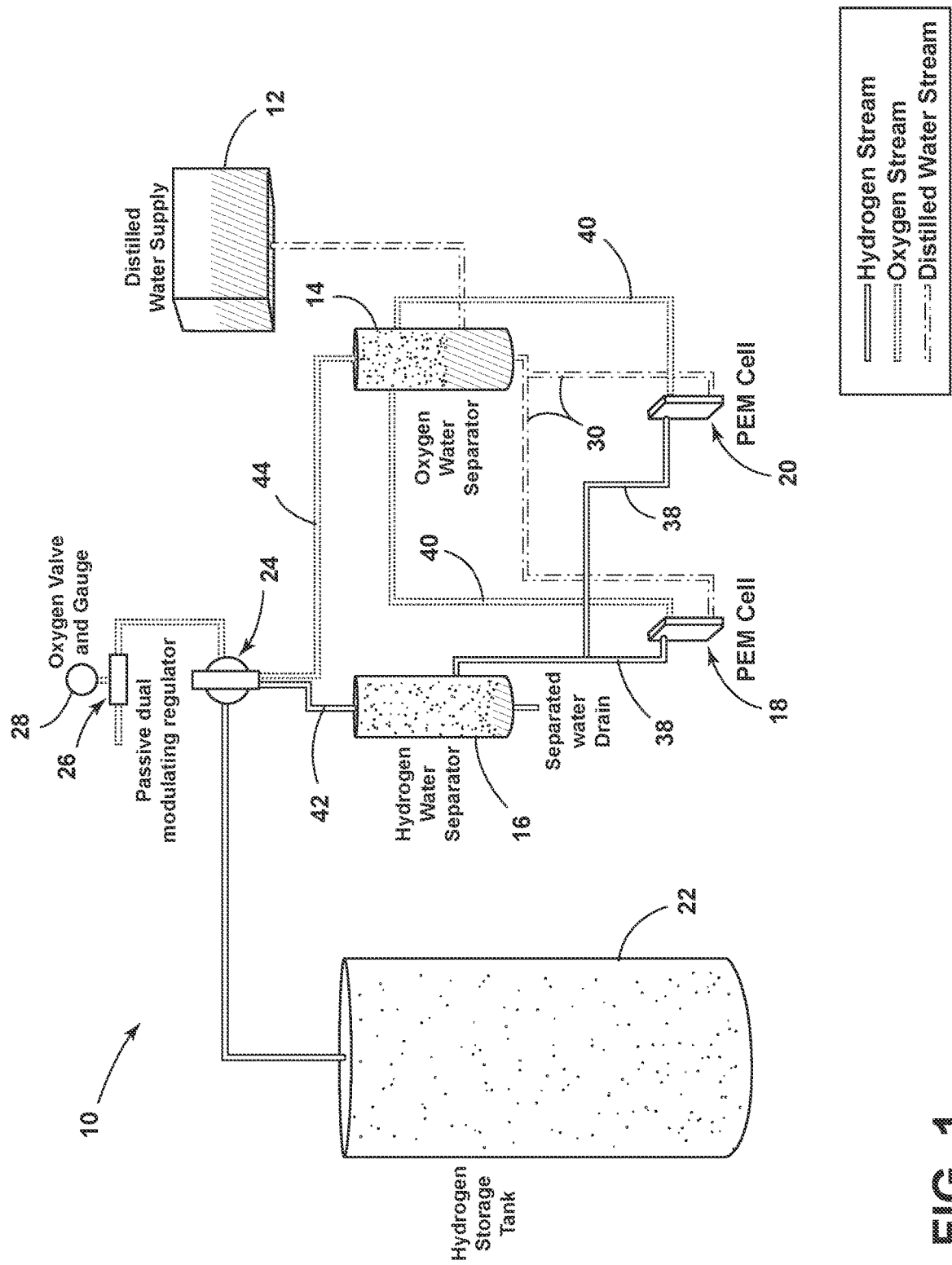
FIG. 1 is a schematic diagram of a hydrogen generation system in accordance with one embodiment.

Referring first to FIG. 1, a hydrogen generation system 10 in accordance with an exemplary embodiment includes a source of distilled or deionized water 12, an oxygen-water separator 14, a hydrogen-water separator 16, two PEM cells 18, 20, a hydrogen storage tank 22, a passive dual modulating regulator 24, and an oxygen valve 26 and gauge 28. The PEM cells 18, 20 can include any of a variety of commercially available PEM cells having a proton-exchange membrane 32, an anode 34, and a cathode 36, generally depicted in FIG. 2. At the anode 34 of each PEM cell, feed water is electrochemically split into protons ($H^+$), electrons ($e^-$), and oxygen ($O_2$). The protons are transported via the proton-exchange membrane 32 to the cathode 36. The electrons exit from the anode 34 through an external power circuit, which provides the driving force (cell voltage) for the reaction. At the cathode 36, the protons and electrons combine to produce hydrogen. Though not shown, the hydrogen generating system 10 includes an energy source that creates the cell voltage for the series-connected PEM cells 18, 20. The energy source can be solar photovoltaic, solar thermal, or geothermal, by non-limiting example.

Referring again to FIG. 1, the supply of distilled or deionized water 12, for example distilled municipal water, is fed to the oxygen-water separator 14. Feed water from the oxygen-water separator 14 is gravity fed via a feed line 30 to the anode surface of the first and second PEM cells 18, 20 where it is separated into oxygen and hydrogen as set forth above. The oxygen-water separator 14 acts as the primary water reservoir for the PEM cells 18, 20 and collects excess water carried up with oxygen from the anode-side of the PEM cells 18, 20 via oxygen lines 30. Oxygen gas is then drawn off from the oxygen-water separator 14 into an oxygen output line 44. The hydrogen-water separator 16 receives hydrogen gas and trace amounts of water from the cathode-side of the PEM cells 18, 20 via hydrogen lines 38. The hydrogen gas is drawn off into a hydrogen output line 42. The passive dual modulating regulator 24 is disposed between the hydrogen output line 42 and the oxygen output line 44 for maintaining a balanced pressure between the hydrogen side and the oxygen side of the PEM cells 18, 20. The hydrogen output line 42 is coupled to a pressurized hydrogen storage tank 22, and the oxygen output line 44 is coupled to an oxygen valve 26 and gauge 28 for safely discharging oxygen gas into the atmosphere. While two series-connected PEM cells 18, 20 are shown in FIG. 1, other embodiments can include greater or fewer PEM cells, for example a single PEM cell or three or more PEM cells.

As hydrogen fuel is produced, it is stored in the pressured hydrogen storage tank 22. No compressor is required to pressurize the hydrogen storage tank 22. The PEM cells 18, 20 produce the gases continually until a pressure limit is reached, prompting actuation of a shutoff switch. Hydrogen is produced at twice the rate of oxygen, however since the hydrogen side has a large storage tank 22 to fill and the oxygen side has no storage tank, oxygen gas is released into the atmosphere. Once the slightest hydrogen pressure is present, the oxygen side will start a modulated release of gas to maintain an equal pressure on both sides. The hydrogen fuel may be routed to a gas grill having one or more hydrogen burners. The gas grill can be suitable for personal or commercial applications, for example restaurants or cafeterias. Gas grills operating on hydrogen gas (as opposed to propane) are environmentally friendly in that hydrogen grills generate no carbon emissions and can operate directly from renewable energy, such as solar energy collected by photovoltaic cells. The hydrogen generation system and passive dual modulating regulator are not limited to cooking applications and can be used in other systems as desired, including emergency backup power, transportation, and propulsion systems.

Figure 3:
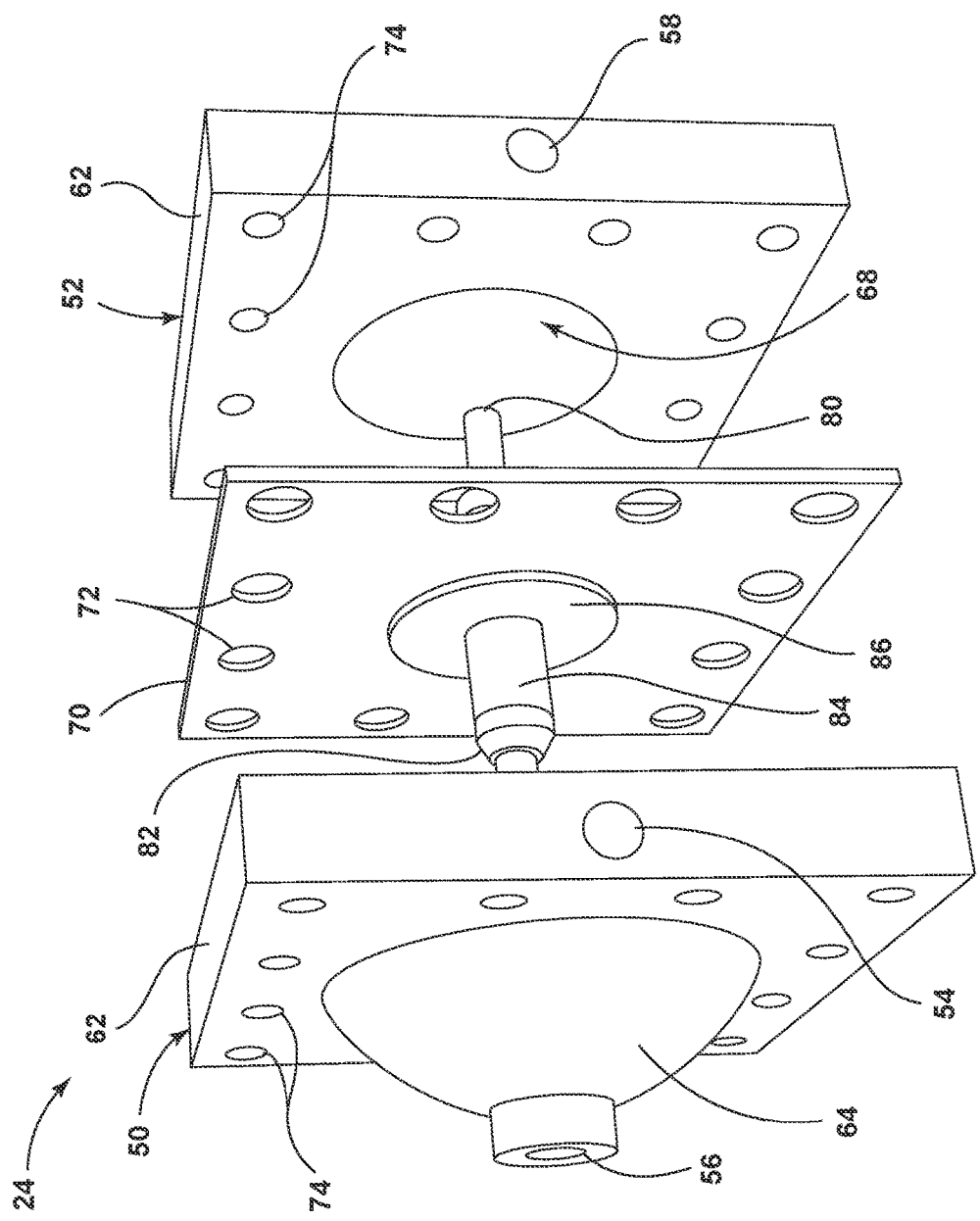
FIG. 3 is a first exploded view of a passive dual modulating regulator for use with the system of FIG. 1.
Figure 4:
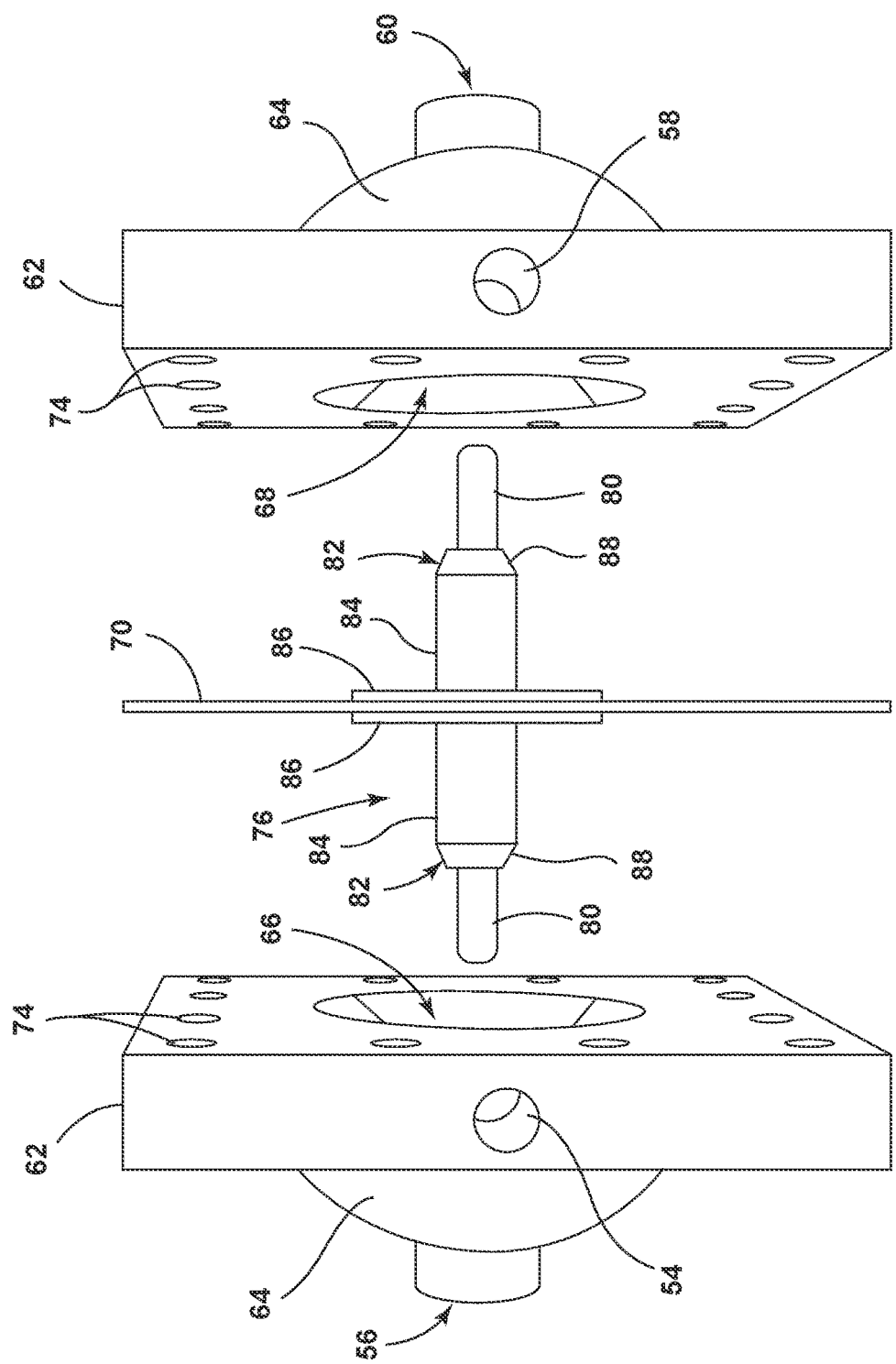
FIG. 4 is a second exploded view of a passive dual modulating regulator for use with the system of FIG. 1.
Figure 5:
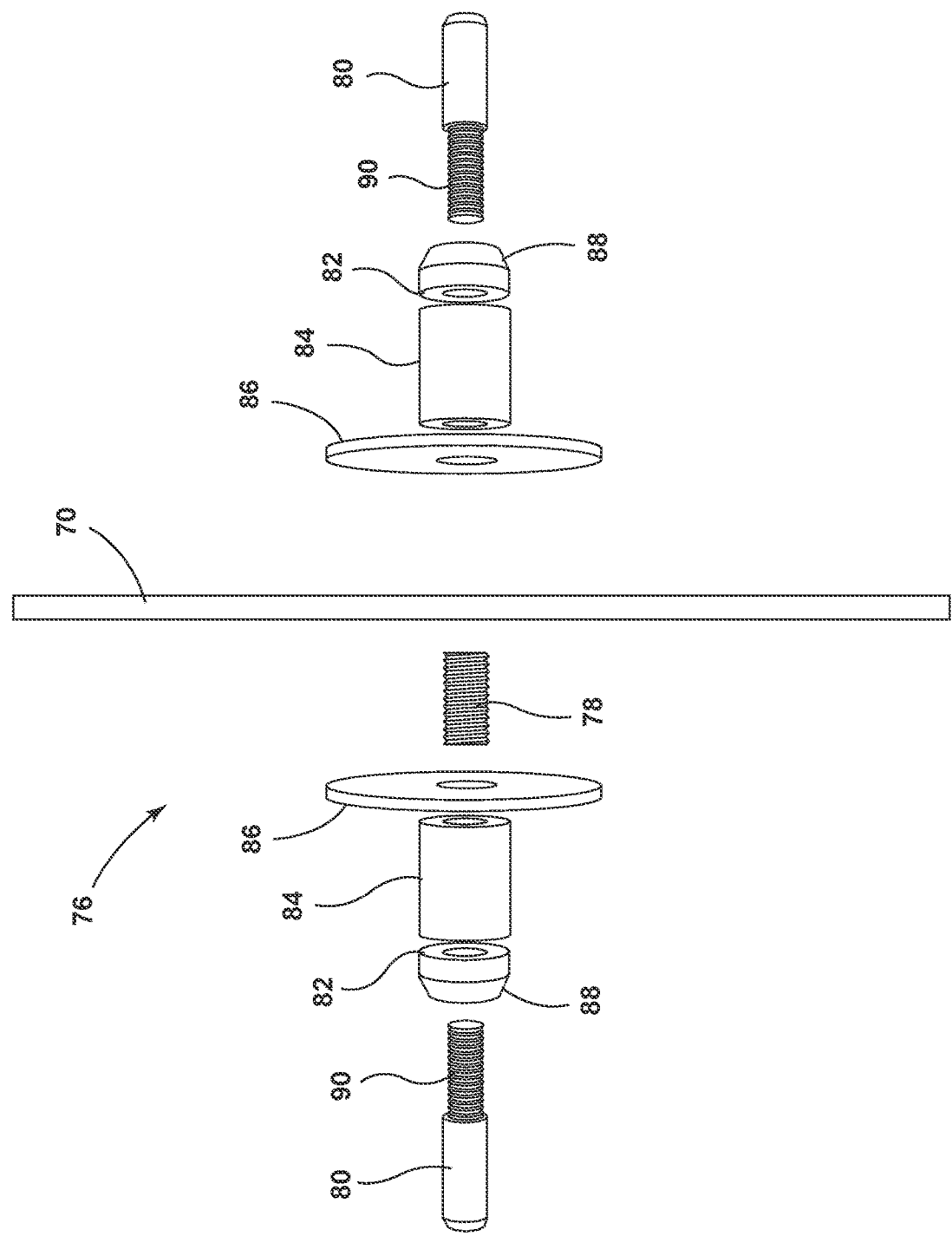
FIG. 5 is an exploded side view of the diaphragm and valve assembly for the passive dual modulating regulator of FIGS. 3-4.

Referring now to FIGS. 3-5, a passive dual modulating regulator 24 in accordance with an exemplary embodiment is illustrated. The regulator 24 includes an outer housing formed by first and second end caps 50, 52 that cooperate to define a spherical internal cavity that is separated into a hydrogen chamber and an oxygen chamber. The first end cap 50 includes an inlet 54 for receiving hydrogen gas from the hydrogen output line 42 and includes an outlet 56 for discharging hydrogen gas to the hydrogen storage tank 22. Similarly, the second end cap 52 includes an inlet 58 for receiving oxygen gas 60 from the oxygen output line 44 and includes an outlet 60 for discharging oxygen gas to the outlet valve 26. Each inlet 54, 58 is formed in a side opening in a rectangular flange 62, and each outlet 56, 60 is formed in a central opening in a hemispherical end wall 64. Consequently, the hydrogen inlet 54 is in fluid communication with the hydrogen outlet 56 via a hemispherical hydrogen chamber 66, and the oxygen inlet 58 is in fluid communication with the oxygen outlet 60 via a hemispherical oxygen chamber 68.

The regulator 24 also includes a flexible diaphragm 70 sandwiched between the first and second end caps 50, 52 to separate the spherical internal cavity into the hemispherical hydrogen chamber 66 and the hemispherical oxygen chamber 68. A series of bolt openings 72 about the periphery of the flexible diaphragm 70 are in alignment with bolt openings 74 in the first and second end caps 50, 52. The flexible diaphragm 70 is optionally formed from silicone rubber or other gas-impermeable membrane material and includes a central aperture. The regulator further includes a valve assembly 76 that extends through the central aperture in the flexible diaphragm 70 for selectively closing the output ports 56, 60 of the hydrogen chamber 66 and the oxygen chamber 68. As best shown in FIG. 5, opposing ends of the valve assembly 76 are joined together by a headless screw 78 and include an alignment rod 80, a valve plug 82, a valve stem 84, and a fender washer 86. The alignment rod 80 is externally threaded at one end for attachment to the valve stem 84 and functions to (a) maintain alignment of the valve assembly 76 and (b) secure the valve plug 82 against the valve stem 84. The valve plug 82 comprises a beveled washer formed from silicon rubber and includes a 60-degree engagement surface 88 for engaging a matching 60-degree valve seat that has been machined into the concave inner surface of each hemispherical end wall 64. The valve stem 84 is internally threaded at a distal end for attachment to a threaded portion 90 of the alignment rod 80 and internally threaded at a proximal end for attachment to the headless screw 78, which joins each side of the valve assembly 76 together.

As pressure from the PEM cells 18, 20 grows, hydrogen and oxygen enter the regulator 24, but with twice as much hydrogen produced as oxygen. Since the hydrogen side has a large storage tank 22 to fill and the oxygen side has no storage tank, oxygen gas is initially released into the atmosphere without restriction. Once the slightest hydrogen pressure is present, the oxygen side will start a modulated release of gas to maintain an equal pressure on both sides. Because the diaphragm 70 is sensitive to even small pressure differentials, the hydrogen side pushes the diaphragm 70 towards the oxygen side to close off the oxygen output port 60 while allowing hydrogen gas to pass through to the hydrogen storage tank 22. The pressure on the oxygen side will slowly build (to match the pressure on the hydrogen side) due to the oxygen output port 60 being closed while oxygen is continuously generated at the PEM cells 18, 20. As the pressure on the oxygen side reaches the pressure on the hydrogen side, the valve assembly centers, and gas flow is allowed at each output port 56, 60. The thin polymer membrane 32 within each PEM cell 18, 20 is balanced on either side, preventing a rupture of the membrane 32. Surplus oxygen is vented through the outlet valve 26 to maintain a balanced pressure between the hydrogen side and the oxygen side.

Figure 6:
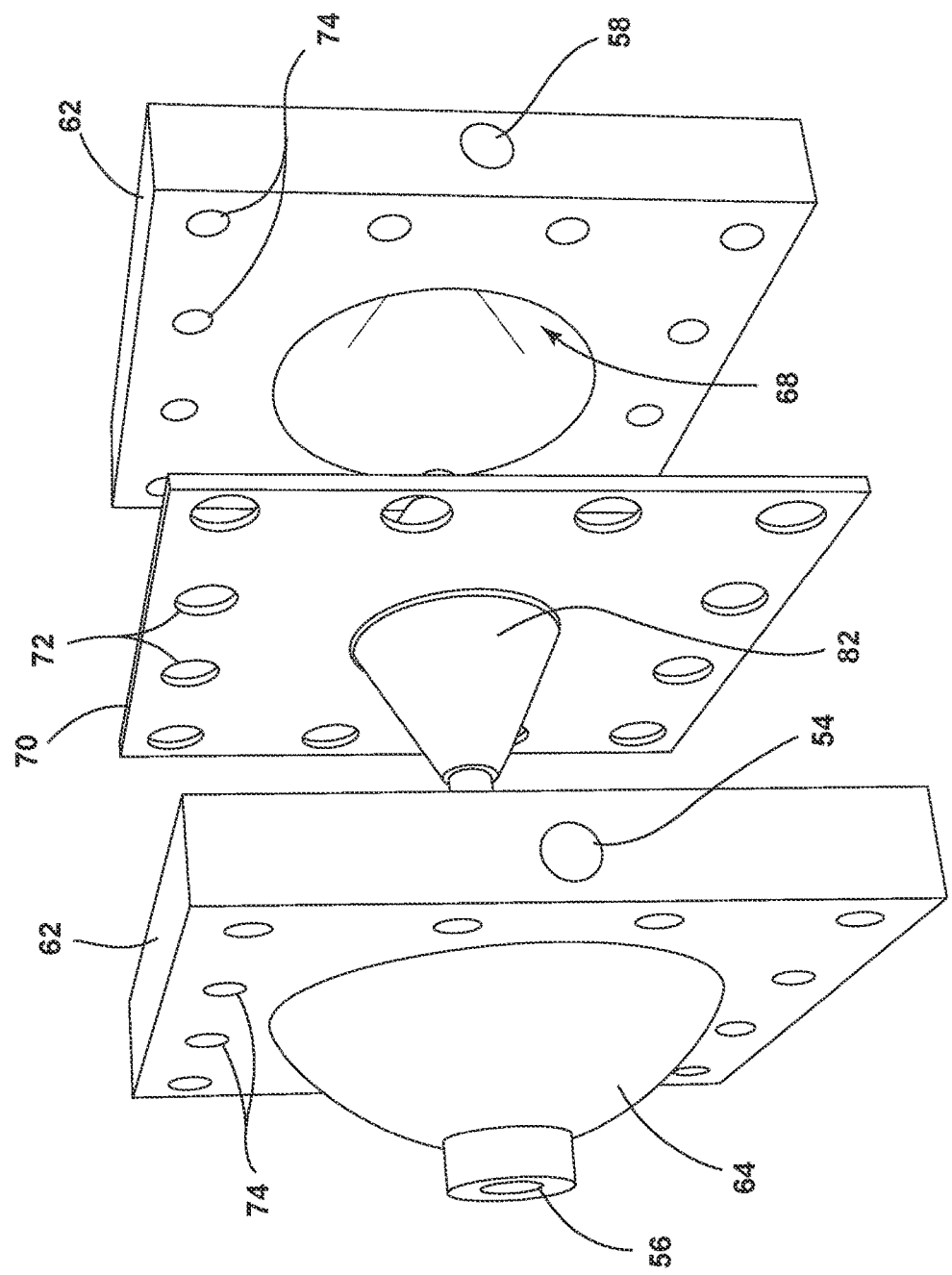
FIG. 6 is a first exploded view of a passive dual modulating regulator in accordance with a further embodiment.
Figure 7:
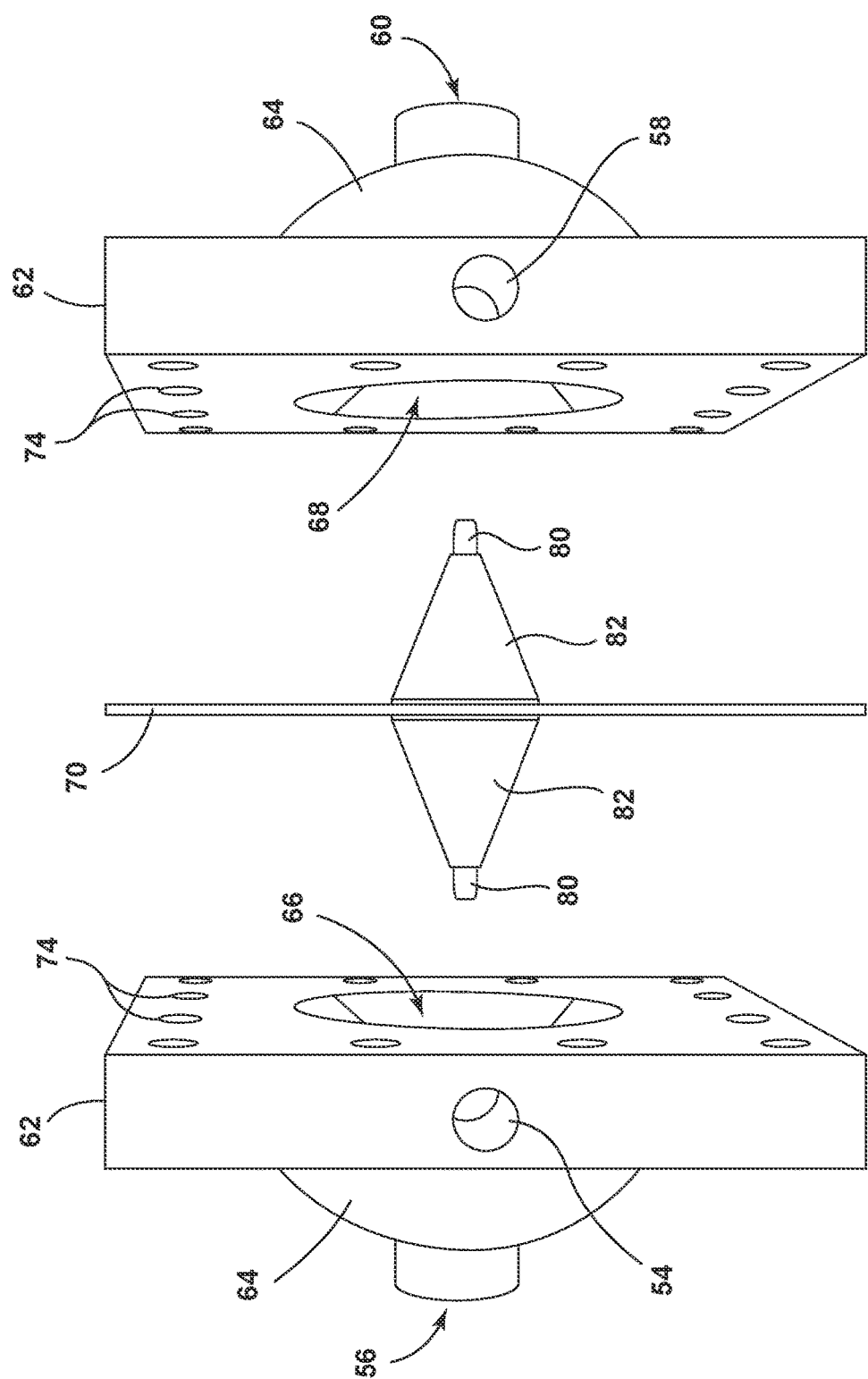
FIG. 7 is a second exploded view of the passive dual modulating regulator of FIG. 6.

The passive dual modulating regulator is not limited to the valve assembly of FIGS. 3-5 and can include other configurations as desired. As illustrated in FIGS. 6-7, for example, the valve assembly can include a valve plug 82 that extends from the flexible diaphragm 70 to the alignment rod 80 on either side of the flexible diaphragm. In this embodiment, the valve plug 82 is cone shaped, having a frustoconical geometry, for closing either output port 56, 60. For example, the valve plug 82 can include a 60-degree cone that matches a 60-degree valve seat that has been machined into the concave inner surface of each hemispherical end wall 64.

Figure 2:
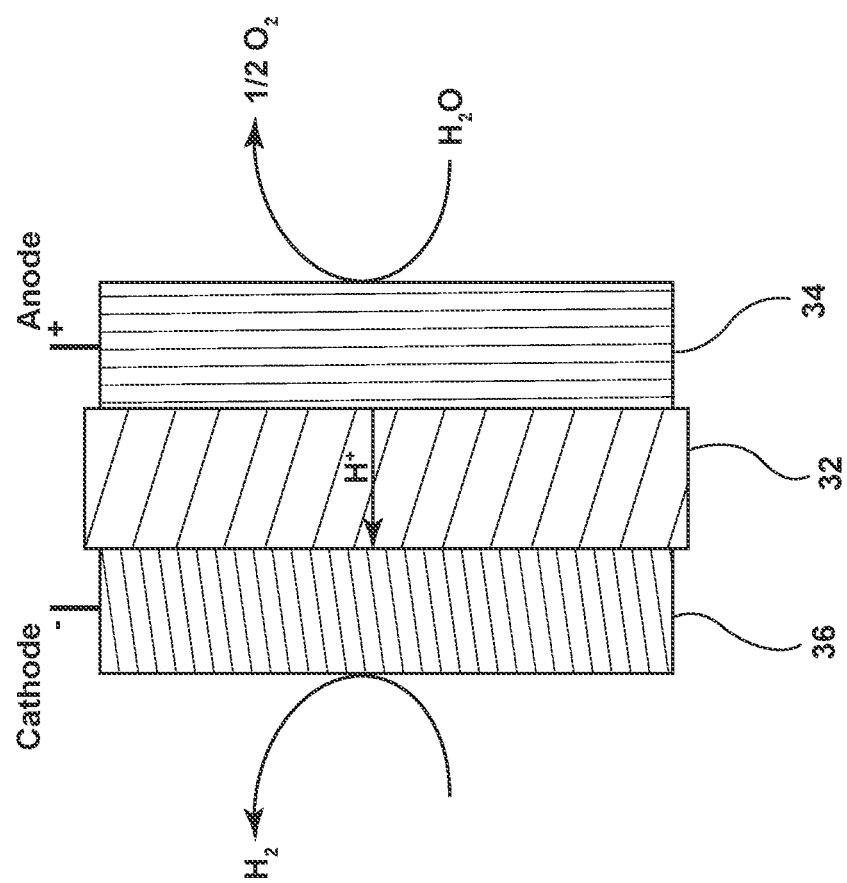
FIG. 2 illustrates a PEM cell for use with the hydrogen generation system of FIG. 1.

A working example of the hydrogen generation system of FIGS. 1-2 including the passive dual modulating regulator of FIGS. 3-5 will now be described. The hydrogen generation system included two series-connected PEM cells powered by a 100 W solar panel. The passive dual modulating regulator included a valve assembly having a machined brass stem that was 0.5-inches in diameter and 0.625-inches in length. The stem was internally threaded at each end. The valve assembly also included a 0.25-inch diameter brass alignment rod that was 1.1-inches in length with one end machined to 0.19-inches and externally threaded. The alignment rod was screwed into the brass stem with a rubber beveled washer therebetween. Two such assemblies were joined to a 0.25-inch×28 headless screw, which extended through a 0.25-inch opening in a silicon rubber diaphragm. Two steel 1.5-inch fender washers were used on either side of the diaphragm to prevent a diaphragm rupture. The hydrogen generation system achieved a hydrogen delivery pressure of greater than 200 PSI with a flow rate of between 320 ml/min to 400 ml/min. By contrast, commercially available hydrogen generators include hydrogen delivery pressures of between 5 and 100 PSI with flow rates of only 160 ml/min, and at several times the cost of the hydrogen generating system of the present invention. Accordingly, the present invention provides a commercially viable source of hydrogen fuel that can run on renewable energy, for example solar power, with markedly improved delivery pressures and flow rates as found in existing systems.

Of note, the numeral values in the foregoing working example are exemplary and not intended to be limiting. For example, 200 psi in the foregoing working example was selected in view of economic and practical considerations, as existing propane tanks are typically rated at 200 psi. The hydrogen generating system can be constructed to operate at higher delivery pressures, including pressures higher than 5000 psi, with only single-digit losses in efficiency.

The above description is presented for illustrative purposes and should not be interpreted as an exhaustive description of all embodiments of the invention or to limit the scope of any claims to the specific elements illustrated or described in connection with this embodiment. Any reference to elements in the singular, for example, using the articles "a," "an," "the," or "said," is not to be construed as limiting the element to the singular. Also, the terminologies "upper," "lower", "above", "below", etc. are intended for clarity of information while describing the embodiments as shown in the figures and are not to be construed as limiting the relationships between the geometric features of this invention.

The invention claimed is:

1. A passive dual modulating regulator comprising:
    a first housing section and a second housing section, wherein each of the first housing section and the second housing section include a gas inlet and a gas outlet;
    a diaphragm clamped between the first housing section and the second housing section along a periphery thereof, wherein a first chamber is positioned on a first side of the diaphragm and a second chamber is positioned on a second side of the diaphragm; and
    a valve assembly extending through the diaphragm and including a first valve plug in alignment with a valve seat in the first housing section and including a second valve plug in alignment with a valve seat in the second housing section, wherein a pressure differential between the first chamber and the second chamber causes the diaphragm to deflect toward a region of lesser pressure, such that the valve assembly restricts and then seals the gas outlet for the first chamber or the second chamber to equalize the pressure within the first chamber and the second chamber.

2. The regulator of claim 1, wherein the first housing section includes a first hemispherical end wall and the second housing section includes a second hemispherical end wall.

3. The regulator of claim 2, wherein the gas outlet for the first housing section extends through the first hemispherical end wall, and wherein the gas outlet for the second housing section extends through the second hemispherical end wall.

4. The regulator of claim 1, wherein the first housing section and the second housing section each include a flange plate defining the gas inlet for the corresponding housing section.

5. The regulator of claim 1, wherein the first valve plug comprises a first beveled washer and wherein the second valve plug comprises a second beveled washer.

6. The regulator of claim 1, wherein the valve assembly includes:
    a first alignment rod extending from the first valve plug; and
    a second alignment rod extending from the second valve plug.

7. The regulator of claim 1, wherein the valve assembly includes a first fender washer on a first side of the diaphragm and a second fender washer on a second side of the diaphragm.

8. The regulator of claim 1, wherein the diaphragm and the valve plug are each formed from an elastomeric material.

9. The regulator of claim 1, wherein the diaphragm is gas-impermeable and includes a central aperture for the valve assembly.

10. The regulator of claim 9, wherein the valve assembly includes a headless screw extending through the central aperture for attachment to first and second valve stems.

11. A hydrogen generation system comprising:
a proton-exchange membrane (PEM) cell;
an oxygen-water separator receiving oxygenated water from an anode-side of the PEM cell and including an output;
a hydrogen-water separator receiving hydrogenated water from a cathode-side of the PEM cell and including an output; and
a passive dual modulating regulator coupled to the output of the oxygen-water separator and the output of the hydrogen-water separator, the passive dual modulating regulator including:
a diaphragm clamped between a first housing section and a second housing section;
a bi-directional valve assembly extending through the diaphragm and including a first valve plug in alignment with a valve seat in the first housing section and including a second valve plug in alignment with a valve seat in the second housing section, wherein a pressure imbalance across the diaphragm causes the diaphragm to deflect towards the first valve seat or the second valve seat to equalize the pressure within the passive dual modulating regulator.

12. The system of claim 11, further comprising a storage tank in fluid communication with the output of the hydrogen-water separator via the passive dual modulating regulator.

13. The system of claim 11, further comprising a source of distilled or deionized water in fluid communication with the PEM cell.

14. The system of claim 11, wherein:
the first housing section includes a first flange and hemispherical end wall, and
the second housing section includes a second flange and hemispherical end wall.

15. The system of claim 11, wherein the first valve plug comprises a first beveled washer and wherein the second valve plug comprises a second beveled washer.

16. The system of claim 11, wherein the bi-directional valve assembly includes:
a first alignment rod extending from the first valve plug; and
a second alignment rod extending from the second valve plug.

17. The system of claim 11, wherein the valve assembly includes a first fender washer on a first side of the diaphragm and a second fender washer on a second side of the diaphragm.

18. The system of claim 11, wherein the diaphragm and the valve plug are each formed from an elastomeric material.

19. The system of claim 11, further comprising a discharge valve in fluid communication with the output of the oxygen-water separator via the passive dual modulating regulator.

20. The system of claim 11, wherein the PEM cell is a first PEM cell, the system further comprising a second PEM cell that is series connected with the first PEM cell.

* * * * *